3,552,014
EDGE DEBURRING TOOL
Henry Persson, 224 Glenwood Ave.,
Bloomfield, N.J. 07003
Filed Dec. 18, 1969, Ser. No. 886,133
Int. Cl. B26f 3/00
U.S. Cl. 30—169       10 Claims

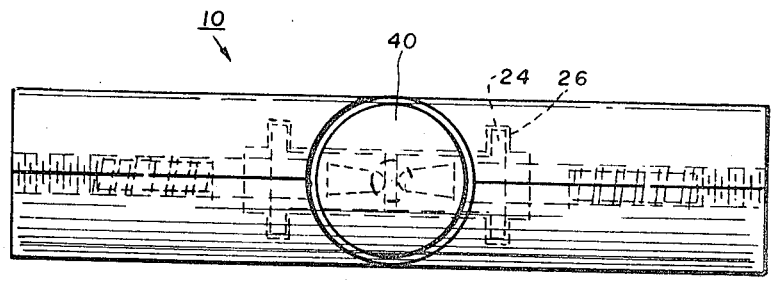
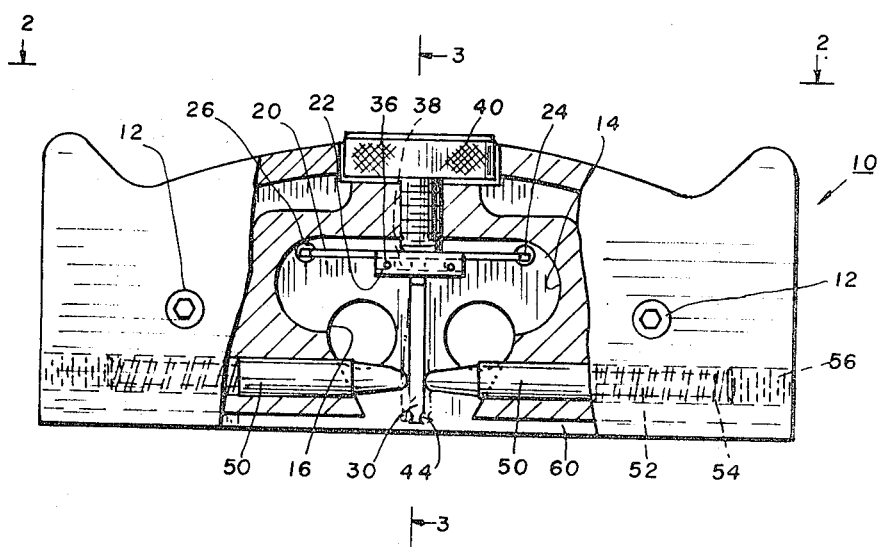
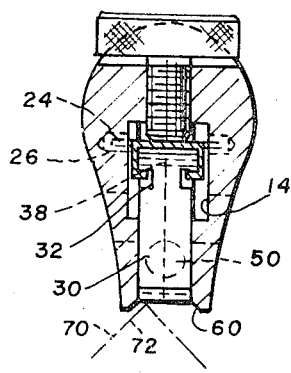

ABSTRACT OF THE DISCLOSURE

A deburring tool adapted for the removal of sharp edges from sheared or machined metal plates and the like includes a handheld body member having a grooved troughway in a face portion. This troughway is disposed to ride and slide on and over the edges of the plate to be deburred. Into a portion of this troughway is adjustably moved a pivoted cutting blade preferably of carbide. Adjustably biased stops in the body member limit the amount of swing of the cutting end of the blade disposed into the troughway. The amount of penetration into the troughway establishes the amount of blade exposed and the degree of swing establishes the angle of cut at which the blade cuts the sharp edge of the metal plate or workpiece.

BACKGROUND OF THE INVENTION

Field of the invention

With reference to classifications of art established in the United States Patent Office the field of art to which this invention pertains is in the general class of "Cutlery" and in particular to the subclass of "cutting tools" pertaining particularly to "scrapers."

Description of the prior art

In the machining or shearing of metal plates and the like the resulting operation usually produces at least one edge which is very sharp. Often these edges have extending metal portions defined as a "wire edge" which makes the handling of the piece difficult and dangerous. As these sharp edges often approach a knife or razor blade in their sharpness, it is both necessary and desirable that for the safe handling of these pieces this sharpness be removed and the edge be slightly beveled. Unless there is a particular reason for the produced edge to be maintained in a sharp condition it is customary to deburr the edge of the piece by filing, sanding or scraping the edge to remove the wire or sharp edge.

Automatic deburring machines are well known but these machines require that the piece be transported to the machine. In other instances where the transport to the machine is not desirable or practical, the operator or assistant uses a file, sanding block or stone, or a power sander to deburr the edge of the plate. This deburring is particularly practiced with plates that have been conventionally sheared by mechanical means. Although this method of operation accomplishes the desired blunting or removing the sharpness from the edge of the piece, such deburring operations often leave irregularly beveled edges in that more metal is removed at one point than another. In addition the use of a file, sanding block, power sander and the like require substantial periods of time to accomplish this deburring operation. This of course raises the labor cost for the production of the piece or product. There have been many attempts to provide deburring tools which will remove the burr or sharp edge from metal plates with a minimum of effort but, insofar as is known, these tools, usually scrapers, have been both large and awkward to handle. In the deburring tool of this invention there is provided a tool which includes a body member easily held in the hand and within this body member is a pivoted carbide cutting blade which is adjustably moveable into a troughway so as to provide a desired depth of trimming cut readily selectable by the user of the tool. As the blade is pivoted to move from an axis normal to an edge riding troughway, the tool is adapted to provide a positive deburring or cutting action whether the tool be moved forwardly or rearwardly in a back-and-forth manner on the edge of the metal plate to be deburred. It is also to be noted that the tool may be readily carried to the piece or plate to be deburred so that the tool is quite versatile in its use.

SUMMARY OF THE INVENTION

The present invention may be summarized at least in part with reference to its objects.

It is an object of the present invention to provide, and it does provide, a handheld cutting tool having a body portion with a troughway adapted to slide and ride on the sharp edge of a workpiece, said scraper having a pivoted cutting blade whose free end has cutting edges disposed to engage the edge of the workpiece when the blade is selectively moved into the troughway a determined distance, and in which there is means providing for the blade being adjustably limited in its swinging movement as it cuts the edge of the workpiece.

It is a further object of the present invention to provide, and it does provide, a handheld cutting or deburring tool in which there is provided a body member having a troughway formed in a face portion, the troughway disposed to ride and slide on and over the edges of the workpiece or plate to be deburred. A cutter blade has one end pivotally carried on a spring beam carried in the body member with the beam engaged by an adjusting screw so as to be selectively moved toward or away from the troughway to move the cutting end of the blade to a determined position in the troughway. Adjustable stops limit the swing of the blade so that the cutting edge of the blade in its cutting action engages the edge of the workpiece at a determined cutting angle.

INTENT OF THE DISCLOSURE

Although the following disclosure offered for public dissemination is detailed to insure adequacy and aid in understanding of the invention, this is not intended to prejudice that purpose of a patent which is to cover each new inventive concept therein no matter how it may later be disguised by variations in form or additions of further improvements. The claims at the end hereof are intended as the chief aid toward this purpose, as it is these that meet the requirement of pointing out the parts, improvements or combinations in which the inventive concepts are found.

There has been chosen a specific embodiment of the edge deburring tool providing a preferred means for cutting the sharp edge of a workpiece or plate. This specific embodiment has been chosen for the purposes of illustration and description as shown in the accompanying drawing wherein:

BRIEF DESCRIPTION OF THE DRAWING

FIG. 1 represents a side view of the deburring tool of this invention with a portion of the tool body broken away to show the internal arrangement of the tool;

FIG. 2 represents a plan view of the tool and looking in the direction of the arrows 2—2 of FIG. 1, and FIG. 3 represents a sectional view of the tool with the view taken on the line 3—3 of FIG. 1.

In the following description and in the claims various details will be identified by specific names for convenience; these names, however, are intended to be generic in their application. Corresponding reference characters refer to like members throughout the several figures of the drawing.

The drawing accompanying, and forming part of, this specification discloses certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE PREFERRED EMBODIMENT

Referring now in particular to the deburring tool as shown in FIGS. 1 through 3 there is shown a body member 10 which, as reduced to practice, is made of like formed halves which are assembled and retained together by means of cap screws 12. In the midportion of this body there is provided a recess 14 and a pair of lightening discharge holes 16 formed through the side walls. Through these holes 16 chips and dirt may be discharged from the interior portion of the body 10. Carried in the upper portion of the recess is a spring 20 having a U-shaped or channel-shaped center portion 22. The ends of the spring 20 are formed with outwardly extending wings or tips 24 which are disposed to enter and be pivotally retained in sockets 26 formed in the side walls of the cavity 14.

Within the channel portion 22 of the spring 20 there is pivotally carried the upper end of a cutting blade 30 which has its upper end formed to provide outwardly extending ends. The sides of the upper end of the blade have a notch 32 formed in each side providing an upper end which is pivotally retained within the channel 22 of the spring 20. As the cutting blade 30 may be of a selected thickness, it is contemplated that the channel member 22 be of extended length and have removable retaining pins 36 transversely mounted therein. Between a spaced pin 36 and the face of the upper end of the cutting blade 30 there is provided a spacer block on member 38 which is carried within the channel 22 so as to more or less centrally position the cutting blade 30 and to pivotally retain the upper end of this blade in the channel 22 of the spring 20.

Threadedly carried in the upper portion of the body 10 is an adjusting member 40 which in the present embodiment is a thumb screw carried in a recess in the upper portion of the body 10. As the screw is rotated its inner end is caused to engage the upper surface of the spring 20 to move the spring downwardly or to permit the spring to move upwardly and return to its normal position depending on the rotation of the screw. Referring in particular to FIG. 1 it is to be noted that the lower end of the cutting blade 20 is shown as having a small concavity 44 formed in the face and adjacent the end. This concavity provides a means for a sharper cutting edge on each side of the blade end. This undercut is preferably formed in both faces and as they are alike both are identified as 44.

There is also carried in the body 10 a pair of plunger pins 50 disposed on opposite sides of the blade. Each plunger pin is slidable in a guideway formed in the body 10. The forward end of each plunger pin is rounded so as to engage and slide on the face of the cutting blade 30 at a localized position. Each plunger pin also has a reduced shank rear portion 52 which is disposed to engage and retain a compression spring 54 which in the mounted condition is disposed to urge the plunger pin 50 towards the cutting blade 30. A headless screw 56 is carried in a rear threaded portion of each of the guideways provided for the plunger pins 50. These headless screws are adjustable in and out to engage and retain the outer end of the spring 54 and also to act as a stop to limit the outward movement of the plunger pin 50. These adjustable screws 56 engage the outer end of the plunger pin when the pin is pushed outwardly against the bias or tension provided by the compression of the springs.

Use and operation

As seen particularly in FIG. 3 the lower portion of the body member is provided with a troughway 60, which troughway provides a guiding means and a sliding surface for the cutting blades to be moved along the edge of the workpiece or plate which is to be deburred. The pivoted blade 30 by means of the manipulation of screw 40 is caused to be moved into this troughway a determined distance. The screws 56 are adjusted to permit the blade 30 to pivot a small determined amount from the normal or central position as shown in FIG. 1. In normal use the screws 56 are adjusted to permit the blade to be moved approximately one-sixteenth to one-eighth of an inch from its normal or central position so that the sharp cutting edges engage and cut the edge of the metal plate at the desired depth for the deburring operation. In use the tool is grasped in the hand and is disposed at a determined angle to the face of the workpiece so that the desired deburring angle of cut may be performed. A rounded edge is easily generated and obtained by tilting the tool at a few different angles and making a cutting stroke over the edge for each of the different angles.

Referring particularly to FIG. 3 it is to be noted that usually the cutting blade is disposed at approximately forty-five degrees to a surface 70 or a plate 72 shown in phantom outline. This forty-five degrees is an average angle for the deburring cut provided by the tool. It is contemplated that the cutting blade 30 is usually of carbide so as to provide a long useful life. The blade is readily removed from the body 10 for replacement or sharpening by merely removing the screws 12 from one side of the body 10 to permit removal of one-half of the body and uncover the spring 20 and its channel portion 22. Upon uncovering the spring 20, the attached cutting blade 30 is removed after which one of the pins 36 is driven from the channel 22 so as to permit a spacer block 38 to be slid from the channel. After the spacer block is removed the blade 30 is removed for sharpening or replacement.

Because of chips and dirt removed by the cutting blade, a single blade is desired for removing the wire burr when both forward and reverse motions are used. Screws 56 are adjusted to permit the cutting blade 30 to pivot to determined limits to present a desired angle of cut. Screw 40 is adjusted to provide a desired amount of depth of cut to the piece 70 being deburred. The sides and depth of troughway 60 provide a guard for the end of the blade 30 and shield these cutting edges except when brought in way of the material being deburred. In like manner except for the edges of the plate, the top, bottom and side surfaces of the workpiece 70 are protected from cutting by blade 30. This protection is provided by the sides of the troughway and the recessing of the blade in the troughway. The width of the troughway 60 permits the full width of thin sheets of metal, wood, hard rubber, glass, etc., to be deburred and smoothed. The width of the troughway also permits substantially the full width of the cutting edge to be worn to a determined extent of dullness before the blade need be sharpened or replaced.

Although the hook edge cutting end of cutting blade 30 is the preferred embodiment it is to be noted that blades having no concavity 44 formed in their faces have been and may be satisfactorily used. As long as the lower end of the blade 30 has its cutting edges maintained in a sharp condition, the deburring action is easily accomplished by sliding the tool along the edge to be deburred. The sides of the troughway assist in guiding the deburring tool along this edge of the workpiece and in retaining the deburring tool on the edge of the plate or workpiece.

Although it is contemplated that cutting blade 30 is to be made of a carbide alloy, tool steel and other metal cutting materials may be used quite satisfactorily.

"Carbide" as used in the above description refers to the tungsten carbide alloy used in metal cutting bits, blades and cutters. This alloy is available in cast form, sheets, bars, etc. Terms such as "up," "down," "bottom," "top," "front," "back," "in," "out" and the like are applicable to the embodiment shown and described in conjunction with the drawing. These terms are merely for the purposes of description and do not necessarily apply to the position in which the deburring scraper may be constructed or used.

The conception of the deburring tool and its many applications is not limited to the specific embodiment shown but departures therefrom may be made without sacrificing its chief advantages and protection is sought to the broadest extent the prior art allows.

What is claimed is:

1. A deburring tool for removing sharp edges and burrs from the edges of plates and workpieces, said tool including:
   (a) a body member having a troughway provided in a face portion thereof, said troughway adapted to ride and slide on and over the edge of the piece to be deburred;
   (b) a cutter blade carried in the body member and having its inner end pivotally supported and retained in the body;
   (c) means for adjustably moving the cutter blade and its pivot support so as to bring its cutting outer end to and into the troughway to provide exposure of the blade so as to effect a desired depth of cut and to present at least one cutting edge at a position substantially transverse to the axis of the troughway, and
   (d) means for limiting the amount of swing of the cutter blade from its normal position to its cutting condition.

2. A deburring tool as in claim 1 in which the pivot support for the cutter blade is a spring member having means at its midportion for removably retaining the cutter blade in a pivoted condition, said spring being retained by its ends support means in the body so that the spring may be deflected from its normally supported condition.

3. A deburring tool as in claim 2 in which the means for adjustably moving the cutter blade is a screw carried by the body, said screw being manipulatable so as to engage and deflect the spring a determined amount from its normally supported condition.

4. A deburring tool as in claim 3 in which the spring member has its midportion provided with a channel portion and in which the cutting blade has its upper end formed to mate with and slide into and on said channel portion and there be retained by removable means at a selected position.

5. A deburring tool as in claim 3 in which the spring member is formed with end tips disposed to enter and be retained in sockets formed in the side walls of a cavity in the body, said cavity further being disposed to contain the cutting blade.

6. A deburring tool as in claim 1 in which the body is made of mating halves and is assembled by screws and the like and in which the troughway has spaced apart shoulders extending substantially the length of the troughway and with the cutting edges of the cutting blade extending at least the width of the troughway.

7. A deburring tool as in claim 1 in which the means for limiting the amount of swing of the cutting blade includes a pair of plunger pins carried in a guideway in the body, said plunger pins disposed on opposite sides of the blade and with adjustable means carried in the body so as to stop the outward movement of a plunger pin at a determined limit condition.

8. A deburring tool as in claim 7 in which the plunger pins are engaged and urged by springs to move toward the cutting blade and each other to tend to maintain the blade in a position substantially normal to the troughway.

9. A deburring tool as in claim 1 in which the cutting blade has its cutting edges formed with an undercut so as to provide a cutting edge which is less than ninety degrees included angle.

10. A deburring tool as in claim 1 in which the cutting blade is made of an alloy of great hardness such as tungsten carbide.

References Cited

UNITED STATES PATENTS

| | | | |
|---|---|---|---|
| 42,397 | 4/1864 | Peters et al. | 30—169 |
| 2,578,896 | 11/1951 | Moore | 30—321 |
| 3,327,588 | 6/1967 | Yandell | 90—24 |

OTHELL M. SIMPSON, Primary Examiner

U.S. Cl. X.R.

90—24